(No Model.) 4 Sheets—Sheet 1.

C. F. HARDY.
BOLTING APPARATUS.

No. 494,952. Patented Apr. 4, 1893.

Witnesses.
Chauncey Perry
Chas. O. Widener

Inventor.
Colin F. Hardy,
pr R. F. Osgood.
Atty.

(No Model.) 4 Sheets—Sheet 2.

C. F. HARDY.
BOLTING APPARATUS.

No. 494,952. Patented Apr. 4, 1893.

Witnesses.
Chauncey Perry
Chas. R. Widener

Inventor.
Colin F. Hardy,
pr R. F. Osgood,
Atty.

(No Model.) 4 Sheets—Sheet 3.
C. F. HARDY.
BOLTING APPARATUS.

No. 494,952. Patented Apr. 4, 1893.

Witnesses.
Chauncey Perry
Chas. O. Widmer.

Inventor.
Colin F. Hardy,
per R. F. Osgood.
Atty.

(No Model.)　　　　　　　　　　C. F. HARDY.　　　　　　　4 Sheets—Sheet 4.
BOLTING APPARATUS.

No. 494,952.　　　　　　　　　　　　　　　Patented Apr. 4, 1893.

Witnesses.
Geo. B. Selden
C. G. Cranwell

Inventor.
Colin F. Hardy,
pr R. F. Osgood.
atty.

UNITED STATES PATENT OFFICE.

COLIN F. HARDY, OF SCOTTSVILLE, NEW YORK, ASSIGNOR OF ONE-HALF TO LESTER M. GODLEY, OF SAME PLACE.

BOLTING APPARATUS.

SPECIFICATION forming part of Letters Patent No. 494,952, dated April 4, 1893.

Application filed November 11, 1892. Serial No. 451,703. (No model.)

*To all whom it may concern:*

Be it known that I, COLIN F. HARDY, of Scottsville, in the county of Monroe and State of New York, have invented a certain new and useful Improvement in Bolting Apparatus; and I do hereby declare that the following is a full, clear, and exact description of the same, reference being had to the drawings accompanying this specification.

My improvement relates to that class of bolting apparatus known as "scalpers," and used for sifting and separating the crushed stock as it comes from the rollers.

It also relates to that class known as sieve machines, in which the stock passes over inclined screens which are vibrated for the purpose of producing the separation.

The invention consists of a suspension frame, to which is hung a shaker holding the screen or screens, and a peculiar arrangement of eccentrics or cams whereby a bodily vibration is given to the screens both horizontally and vertically.

It further consists in a peculiar means for feeding the material down on the screens, all as hereinafter more fully described and embraced in the claims.

Figure 1:
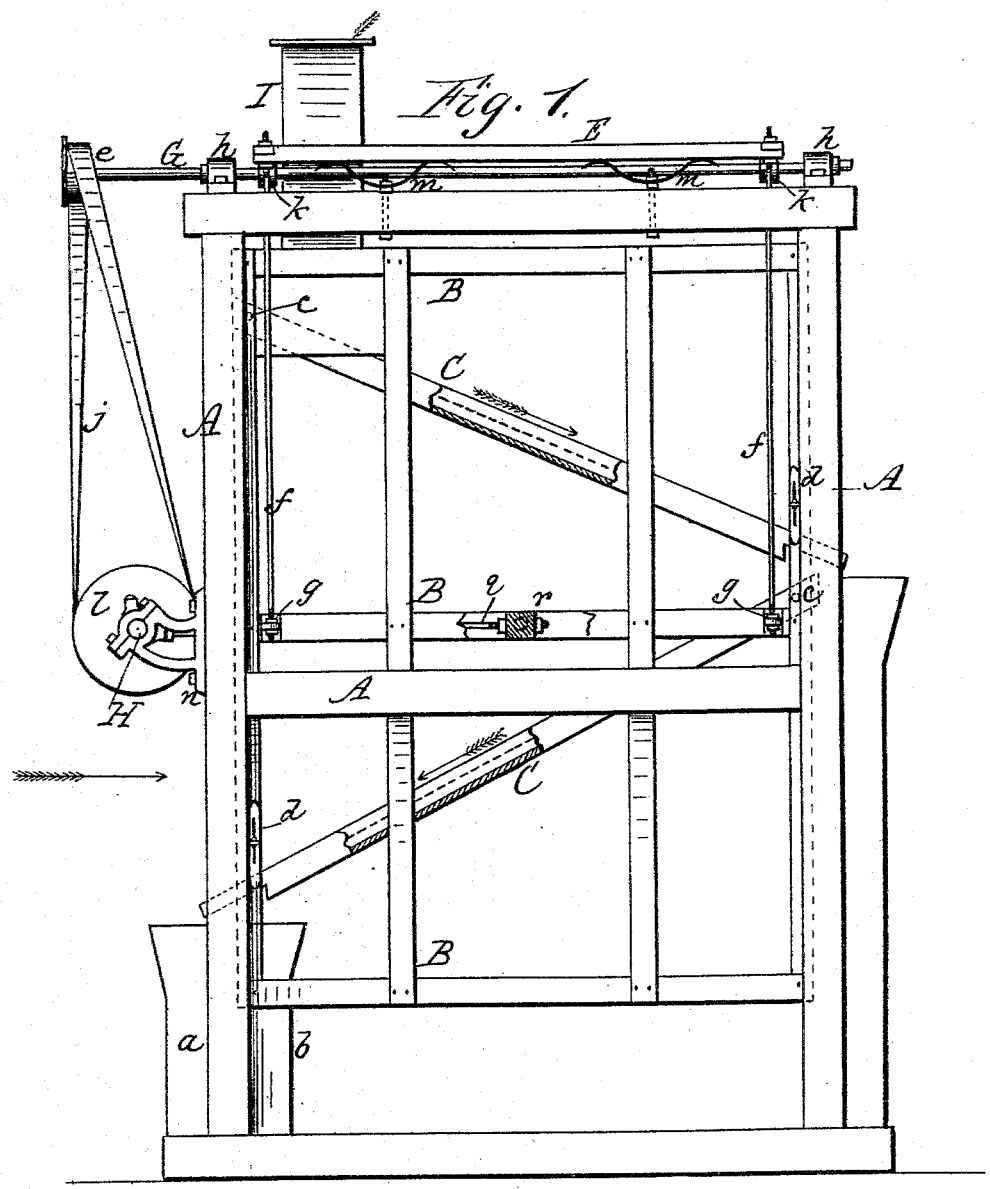
Figure 2:
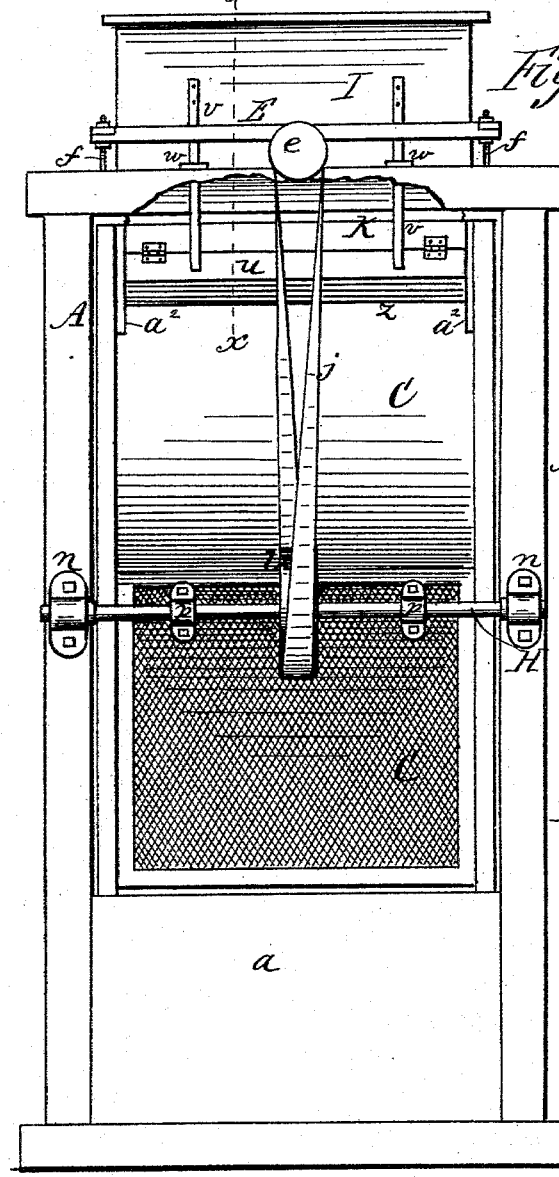
Figure 5:
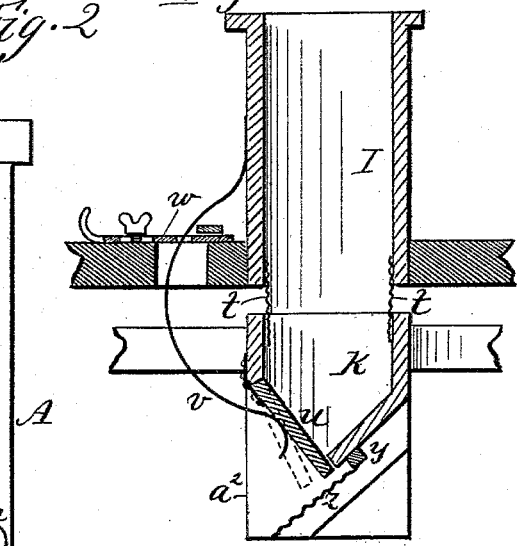
Figure 6:
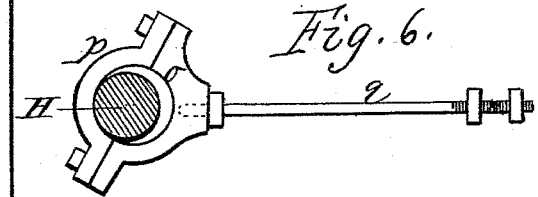
Figure 7:
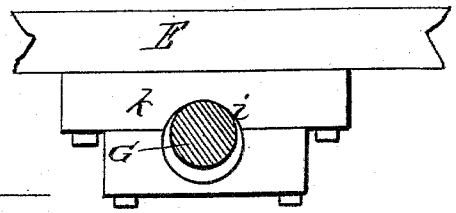
Figure 3:
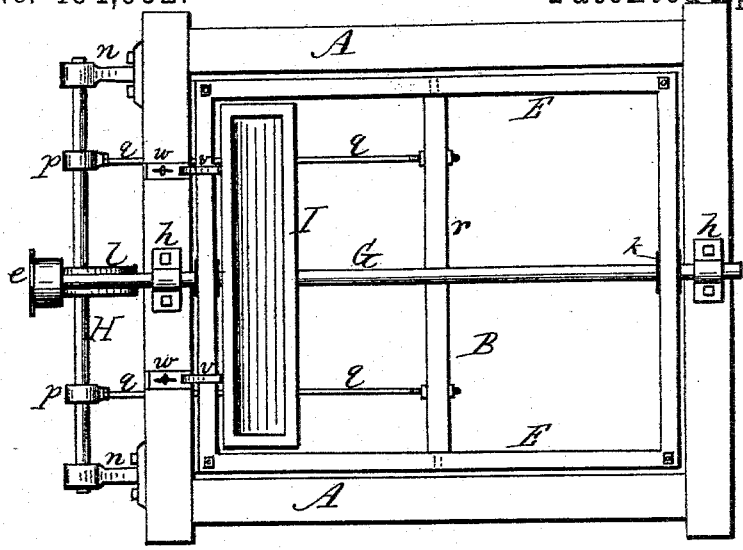
Figure 4:
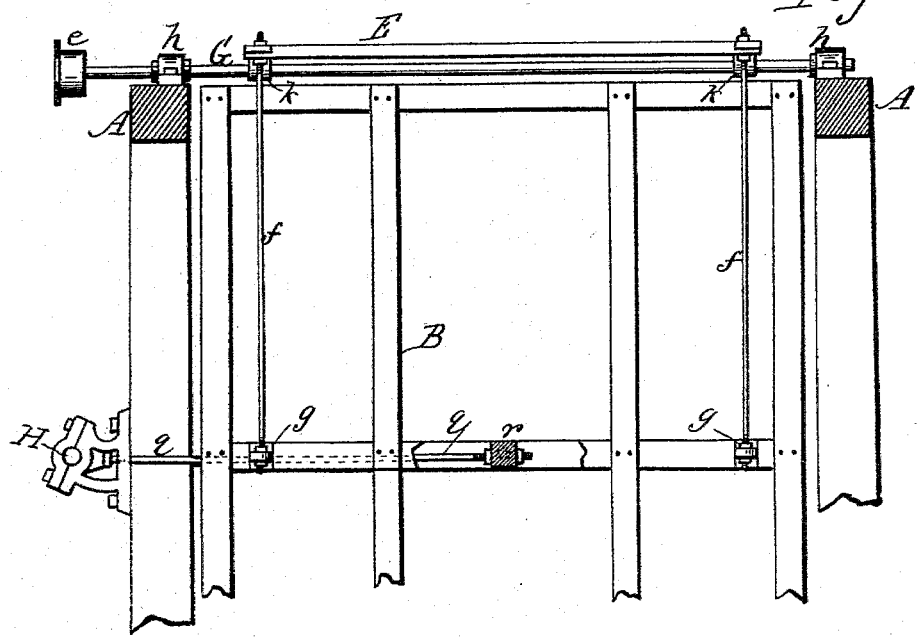
Figure 8:
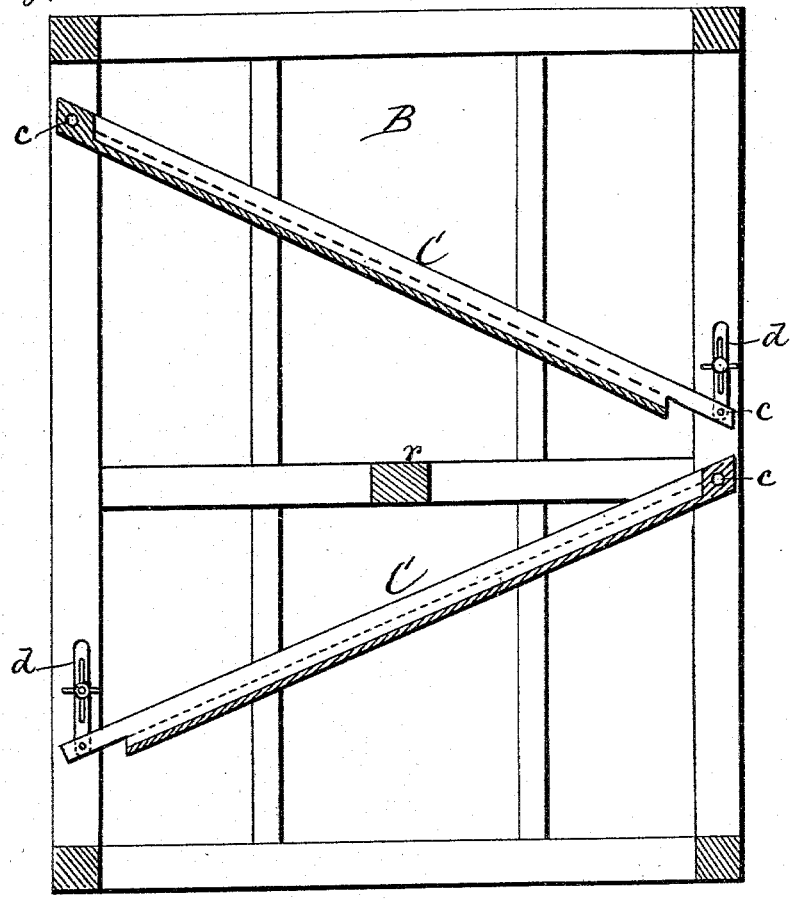
Figure 9:
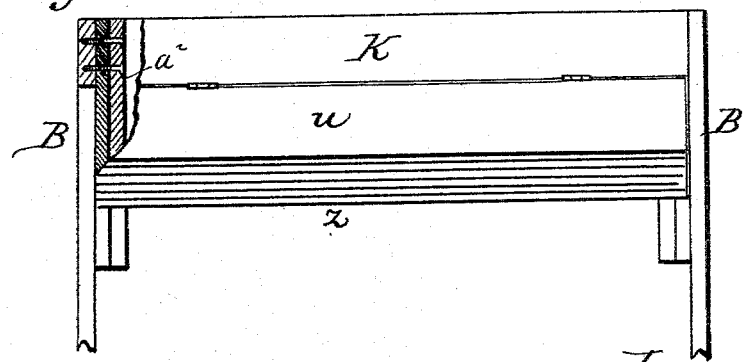

In the drawings—Figure 1 is a side elevation of the machine. Fig. 2 is an end elevation looking in the direction of the arrow at the left in Fig. 1. Fig. 3 is a plan view. Fig. 4 is a diagram showing the top of the main frame in cross section and a side elevation of the upper portion of the shaker and the operating devices connected therewith. Fig. 5 is an enlarged cross section of the hopper in line $x\, x$ of Fig. 2. Fig. 6 is an enlarged cross section of one of the eccentrics for giving the horizontal vibration to the shaker. Fig. 7 is a similar enlarged cross section of one of the eccentrics for giving the vertical vibration. Fig. 8 is a vertical cross section of the shaker, showing the means for hanging and adjusting the screens. Fig. 9 is an elevation, partially in section, of the shaking hopper and its attachments.

A indicates the main frame, which may be of any desired form and construction.

B is the shaker, consisting of a frame resting inside the main frame and capable of both a horizontal and a vertical vibration.

C C are the screens, of which one or more may be used as may be desired. In case but one is used it inclines and makes a separation at the outer end, the tailings being thrown over and the screenings being dropped through into a suitable receptacle. In case two are used, as shown in the drawings, the screenings from the first are dropped onto the head of the second, where another separation is effected, and the two grades are dropped into different receptacles $a\, b$. Each of these screens is pivoted at the upper end as shown at $c\, c$, and the lower end is adjustable higher or lower by means of a slotted hanger $d$, through which passes a thumb screw. By this means the incline of the screens may be changed to meet the necessities of the case. Where two or more screens are used they are of different degrees of fineness, the coarsest being at the top, as shown in Fig. 8.

E is a suspension frame located above the main frame and free from contact with the same. The shaker B is hung to this suspension frame by four spring hangers $f\, f\, f\, f$, one at each corner. The lower ends of the hangers are attached to the shaker about midway of its height as shown at $g\, g$. At top and bottom of the hangers are nuts, one above and the other below the parts to which the hangers are attached, by which means the shaker can be adjusted higher or lower in the main frame.

G is a shaft extending under the suspension frame E, and mounted in boxes $h\, h$ of the main frame. The shaft is provided at opposite ends with eccentrics $i\, i$, which rest and turn in boxes $k\, k$, attached on the under side of the suspension frame. By this means the suspension frame is supported and a vertical vibratory movement is given thereto by the revolutions of the eccentrics. The shaft G may be driven by any suitable means—that shown in the drawings being a belt $j$ passing around a pulley $e$ of the shaft and a larger pulley $l$ below. This vertical vibration of the suspension frame imparts corresponding vertical vibration to the shaker B, by lifting it bodily and then dropping it again, so that the screens are not tilted sidewise, but retain their transverse level position. $m\, m$ are springs placed under the suspension frame on two opposite sides, and serving to retain the upright position of the suspension frame under vibration, and also to produce uniformity of action, and to obviate shock. The springs are adjustable higher or lower by means of set nuts as shown.

H is a shaft mounted in bearings n n at one end of the machine, and provided with eccentrics o o which turn in boxes p p. To these boxes are attached rods q q which extend inward and are attached at their opposite ends to a cross bar r having end pivots or journals that rest in the sides of the shaker B. By this means the horizontal vibrations are given to the shaker and consequently to the screens. The ends of the rods connecting with the cross bar are provided with nuts by which the shaker can be adjusted. The pivots on the ends of the cross bar prevent binding and allow the shaker to vibrate in a horizontal line.

I is a permanent hopper attached to the main frame, through which hopper the material is fed from a spout.

K is a supplementary hopper below the main hopper and attached to the shaker B. These hoppers are separated by a space sufficient to allow the vertical vibrations of the shaker and while the top hopper I, is fixed and permanent, the other, K, moves with the shaker.

t t are flaps of cloth or other flexible material attached inside the upper hopper and extending into the lower one and serving to prevent escape of the material at the sides as it is fed down from one hopper to the other. The lower end of the supplementary hopper K is made angular or hopper-shaped as shown, and is provided with a hinged cover or valve u, pressed up to close the passage by means of curved springs v v attached to the sides of the upper hopper and passing down through a slot in the top of the main frame. Each of these springs passes through an opening in a slide w, which is adjustable forward and back to give more or less tension to the spring. As shown in the drawings this adjustment is produced by means of a thumb screw that passes through a slot of the slide. By this means the valve u is made to close with more or less pressure. The weight of the material in the hopper pressing against the valve causes it to open just sufficiently to feed the requisite amount down on the screen, and the springs resist this opening action, but yield sufficiently to allow the feed. On the bottom of the fixed part of the hopper K is an offset y, and to this is attached an inclined plate z, which opens onto the screen. This plate serves to carry and spread the material, and is preferably corrugated as shown, but may be made plain if desired. The supplementary hopper K is fitted removably between side boards $a^2$ $a^2$ of the shaker frame, to which it is attached by screws or otherwise, by which means it can be inserted and removed at pleasure.

Various modifications can be made without departing from the spirit of my invention. Cams may be used instead of eccentrics. Two shafts instead of one may be used under the frame E, each having eccentrics, and the shaft H may have a single eccentric instead of two.

By the use of the suspension frame E located above the main frame, and the hangers connecting it with the shaker, a bodily vertical vibration can be imparted to the shaker without tilting it to either side. The motion is a compound one, the vibration being both horizontal and vertical. The horizontal motion spreads the material and works it downward, while the vertical one gives it a toss, turns it over, and presents different surfaces to the screen, by which means the flow is more thoroughly sifted out.

I am aware that it is common to suspend screen shoes and frames by means of hangers, also to impart vibrating motion by means of cams and cranks. Such features I do not broadly claim.

What I claim as new, and desire to secure by Letters Patent, is—

1. In a bolting apparatus, the combination, with the shaker, of a suspension frame located above the machine, hangers connecting the shaker with the frame, eccentrics attached to a shaft for imparting horizontal vibrations to the shaker, and other eccentrics attached to a shaft for imparting vertical vibrations to the shaker, as specified.

2. In a bolting apparatus, the combination, with the shaker, of a suspension frame located above the machine, hangers connecting the shaker with the frame, eccentrics attached to suitable shafts for imparting horizontal and vertical vibrations to the shaker, and a set of springs interposed between the suspension frame and a stationary part, for equalizing the action, as herein shown and described.

3. In a bolting apparatus, the combination, with the main frame and shaker, of a suspension frame located above the main frame, hangers connecting the shaker with the suspension frame, eccentrics attached to shafts imparting horizontal and vertical vibrations to the shaker, a hopper attached to the main frame, another hopper attached to the shaker, with flexible flaps covering the space between the two, a hinged valve at the bottom of the lower hopper, and a spring for holding the valve against internal pressure, as and for the purpose specified.

4. The combination of the hopper attached to the main frame, the hopper attached to the shaker, the flexible flaps closing the space between the hoppers, the valve at the bottom of the lower hopper, the springs for closing the valve, and the slides for adjusting the springs, as described.

In witness whereof I have hereunto signed my name in the presence of two subscribing witnesses.

COLIN F. HARDY.

Witnesses:
R. F. OSGOOD,
CHAS. A. WIDENER.